(No Model.)
S. A. PRESCOTT.
HOLDBACK FOR CARRIAGES.
No. 308,093. Patented Nov. 18, 1884.
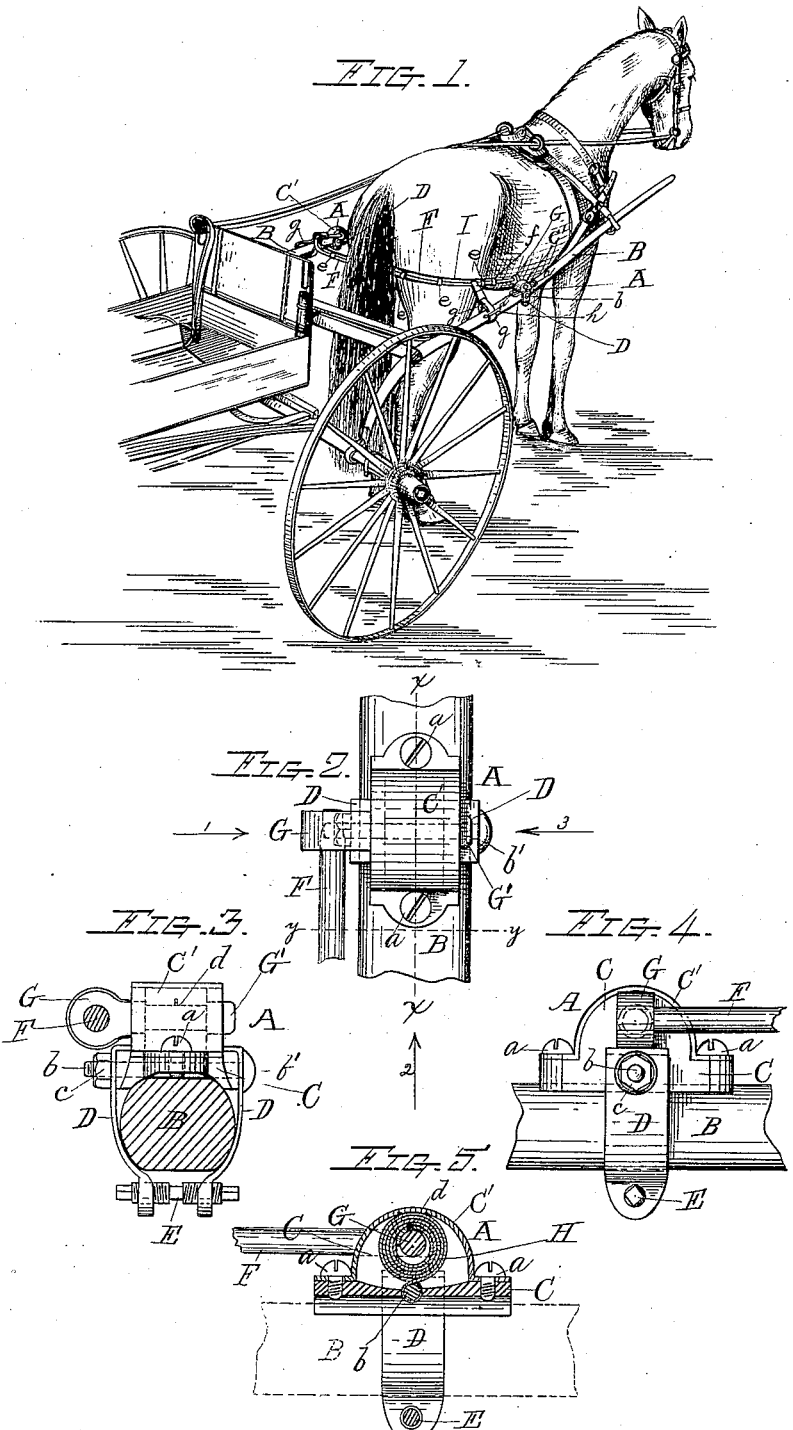
Witnesses:
Thos. H. Dodge
Chas. D. Gay
Inventor:
Samuel A. Prescott

UNITED STATES PATENT OFFICE.

SAMUEL A. PRESCOTT, OF SUTTON, MASSACHUSETTS.

HOLDBACK FOR CARRIAGES.

SPECIFICATION forming part of Letters Patent No. 308,093, dated November 18, 1884.

Application filed August 6, 1884. (No model.)

*To all whom it may concern:*

Be it known that I, SAMUEL A. PRESCOTT, of Sutton, in the county of Worcester and Commonwealth of Massachusetts, have invented certain new and useful Improvements in Holdback Attachments for Carriages; and I do hereby declare that the following is a full, clear, and exact description of the same, reference being had to the accompanying drawings, forming a part of this specification, in which—

Figure 1 represents a perspective view of my invention applied to practical use. Fig. 2 represents, upon an enlarged scale, a plan or top view of that part of the device which is attached to the shaft, as will be hereinafter more fully described. Fig. 3 represents a cross-section on line $y\ y$, Fig. 2, looking in the direction of arrow 2, same figure. Fig. 4 represents a side view of the parts shown in Fig. 2, looking in the direction of arrow 1, same figure; and Fig. 5 represents a longitudinal section on line $x\ x$, Fig. 2, looking in the direction of arrow 3, same figure.

To enable those skilled in the art to which my invention belongs to make and use the same, I will proceed to describe the same more in detail.

The nature of my invention consists in certain improvements in self-adjusting holdback devices for carriages, carts, and other vehicles.

In the drawings, the part marked A represents the device for attaching and holding the holdback-rod F to the carriage thills or shafts B, and which consists of a box, C, fastened to the shaft B by means of arms D D, the upper hooked or bent ends of said arms clasping the sides of the box C, to which they are securely fastened and held by means of the longitudinal bolt $b$, which passes through holes in the upper ends of the arms D, and also through a hole in the base of box C, its head $b'$ being drawn against one of the arms D by means of a nut, $c$, which screws upon the other end of said bolt, thereby drawing the ends of both of the arms D firmly against the box C. The lower ends of said arms D are secured together by means of a right and left screw, E, by turning which screw the arms D can be securely clamped to shafts B.

In lieu of right and left screw E, the lower ends of arms D may be made round and provided with screw-threads, to pass through holes in a yoke, and then receive nuts for drawing down box C and fastening it firmly to the shaft B. Caps C' are secured to the tops of boxes C by means of headed screws $a\ a$, thereby protecting the coiled springs H and journals G from dirt and injury. The respective ends of the holdback-rod F pass through holes in the heads of journal-pieces G, to which said ends of holdback-rod F may be fastened by heading down, pinning by nuts, or by any other suitable means. The small ends of journal-pieces G pass through holes in the upright sides of boxes C, and, as they enter from the inside, are not liable to be displaced; but, if preferred, they may have nuts or pins combined with their outer ends for retaining them in their proper relative positions.

In the drawings, nuts G' are shown in full and dotted lines applied to the ends of journal-pieces G. One end of coiled steel spring H is looped and fastened to a bolt, $b$, while the other end of each of said springs is fastened to its respective journal-piece G by pinning, as at $d$, or otherwise. In securing these springs in position they are first coiled or wound up, so as to create sufficient tension, when fastened into position, to throw the rear curved part of holdback-rod F up, and adjustable straps $g$ are combined with the carriage-shafts in such a manner that the height to which the holdback-rod F can rise is readily adjusted.

It will be noticed that the ends of journal-pieces G to which the ends of holdback-rod F are attached extend out beyond the arms D a sufficient distance to allow the curved portion of the holdback-rod F to rise and fall freely, and that, too, without the ends of journal-pieces G coming in contact with the upper ends of arms D.

To the inner side of the curved part of the holdback-rod F is secured, in this instance, a wide piece of leather, I, similar to that used in the common holdback part of the breeching of a harness, the same being fastened at its ends to the rod F, in this instance by means of metal clasps or clips $f$, one at each end of the leather facing, while intermediate loops e are employed to retain the central portion of strap I in proper relation to the holdback-rod F. This arrangement is preferred in applying my invention to practical use, inasmuch as the contact of the holdback device with the animal is not so unyielding and rigid.

In lieu of springs H, any other suitable spring device may be employed combined with the rod F in any suitable manner, provided such spring shall cause the rod to spring up, thereby keeping it in proper position; and, if preferred, in lieu of the fastening devices f and e of the leather facing of rod F, two pieces of leather—one on each side of the curved portion of rod F—may be applied, their edges being stitched together, thus incasing the rod F permanently.

Guide loops or straps h may be secured to the carriage-shafts B, for retaining the adjusting-straps g (one on each side of the horse) in proper relative positions.

Instead of making holdback-rod F in one piece, it may be made in two pieces, one section on each side of the horse, leaving the center portion of strap I without an iron support. The ends of strap I should be very securely attached to such side sections of rod F.

My invention has been practically tested, and has been highly commended by those who have witnessed its operation.

Those skilled in the art to which my invention belongs will readily understand and appreciate the practical advantages of that class of inventions to which my present improvement relates.

In the first place the holdback device is not attached to the "harness" part, so called, and does not require to be removed and attached to the horse every time the latter is harnessed; second, the horse can perform its work freer and with less fatigue; third, the horse is not so liable to interfere and trip in descending hills as with the old-fashioned holdback device, since that has a tendency to draw the animal's limbs together, whereas by my invention the limbs are left freer and the horse's feet are not so liable to strike and interfere as in the use of the old device; fourth, in case of a runaway or the falling of a horse attached to a carriage, the holdback attachment, being separate from the harness of the horse, does not serve as a connection to hold the horse to the carriage, thereby rendering the improved device safer and less liable to occasion injury in case of accidents; fifth, the expense of a harness is very much lessened; and, sixth, the device is self-adjusting—that is, when the carriage presses against the horse, as in going down hill, the device naturally lowers itself to an easy and proper position for holding the carriage back, and as soon as the bottom of the hill is reached and the draft comes upon the tugs the holdback device rises automatically by means of the action of springs H and resumes its former and normal position.

Having described my improvements in holdback attachments, what I claim therein as new, and desire to secure by Letters Patent, is—

1. The combination, with a flexible holdback, I, for contact with the animal, of a supporting-rod, F, substantially as described.

2. The combination, with a flexible holdback for contact with the animal, of rigidly-supporting side pieces, F, attached to the shafts, for the purposes stated.

3. The combination, with a flexible holdback for contact with the animal, of a supporting device hinged to the shafts of a carriage, substantially as described.

4. The combination, with the shafts B B of a vehicle, of the supporting-rod F, flexible holdback I, and holding clips or loops D, substantially as and for the purposes set forth.

5. The combination, with the holdback-rod F, hinged in the box-piece C, attached to the shafts, of springs H, substantially as and for the purposes set forth.

6. The combination, with shafts B, boxes C, and caps C', of springs H and spring supporting bolts b, substantially as and for the purposes set forth.

7. The combination, with shafts B and boxes C, of adjusting clamping-pieces D and tightening screw-shaft E, substantially as and for the purposes set forth.

8. The combination, with the shafts of a vehicle, of an automatically-adjusting holdback device and regulating-straps g, substantially as and for the purposes set forth.

SAMUEL A. PRESCOTT.

Witnesses:
   THOS. H. DODGE,
   CHAS. D. GAY.